United States Patent
Tsunekawa et al.

(10) Patent No.: US 7,449,031 B2
(45) Date of Patent: Nov. 11, 2008

(54) POLARIZED ELECTRODE FOR ELECTRIC DOUBLE LAYER CAPACITOR, METHOD FOR PRODUCING THE SAME AND ELECTRIC DOUBLE LAYER CAPACITOR

(75) Inventors: Masayuki Tsunekawa, Tokyo-to (JP); Tadafumi Shindo, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 271 days.

(21) Appl. No.: 10/538,714

(22) PCT Filed: Dec. 16, 2003

(86) PCT No.: PCT/JP03/16090

§ 371 (c)(1),
(2), (4) Date: Jan. 3, 2006

(87) PCT Pub. No.: WO2004/055844

PCT Pub. Date: Jul. 1, 2004

(65) Prior Publication Data

US 2006/0126263 A1    Jun. 15, 2006

(30) Foreign Application Priority Data

Dec. 16, 2002  (JP) ............................. 2002-363921

(51) Int. Cl.
*H01G 9/00* (2006.01)

(52) U.S. Cl. .................. 29/25.03; 361/502; 361/503

(58) Field of Classification Search ......... 361/502–505; 29/25.03
See application file for complete search history.

(56) References Cited

U.S. PATENT DOCUMENTS

2002/0061449 A1 *  5/2002  Maruo et al. ................ 429/303

FOREIGN PATENT DOCUMENTS

| JP | 04022117 A | * | 1/1992 |
|----|------------|---|--------|
| JP | 05304050 A | * | 11/1993 |
| JP | 06-226173  |   | 8/1994 |
| JP | 08-141466  |   | 6/1996 |
| JP | 10-055799  |   | 2/1998 |
| JP | 11-221512  |   | 8/1999 |
| JP | 2002-270470 |  | 9/2002 |
| JP | 2003-257471 |  | 9/2003 |
| WO | WO 01/22506 |  | 3/2001 |

* cited by examiner

Primary Examiner—Eric Thomas
(74) Attorney, Agent, or Firm—Ladas & Parry LLP (57) ABSTRACT

An electric double layer capacitor electrode which has a low collector resistance and a high capacitance even when it is provided with an electrode active material layer containing more activated carbon is disclosed. A method for producing such an electric double layer capacitor electrode and an electric double layer capacitor are also disclosed. The electric double layer capacitor is characterized by sealing a polarized electrode, wherein a pattern of electrode active material layer is formed on at least one surface of a collector through intermittent application by a die-coating method or a comma reverse method and the pattern is composed of electrode active material layers arranged at intervals at least in the longitudinal direction of the collector, at least a pair of polarized electrodes, a separator and an electrolytic solution in a container.

3 Claims, 5 Drawing Sheets

38 RUNNING (FLOW) DIRECTION

25A FLOW OF ELECTRODE ACTIVE MATERIAL COMPOSITION AT THE TIME OF APPLICATION

25B FLOW OF ELECTRODE ACTIVE MATERIAL COMPOSITION AT THE TIME OF NON-APPLICATION

(A) PLAN VIEW (B) CROSS-SECTIONAL VIEW (C) CROSS-SECTIONAL VIEW

FIG. 3

38 RUNNING (FLOW) DIRECTION

25A FLOW OF ELECTRODE ACTIVE MATERIAL COMPOSITION AT THE TIME OF APPLICATION

25B FLOW OF ELECTRODE ACTIVE MATERIAL COMPOSITION AT THE TIME OF NON-APPLICATION

FIG. 4

FIG. 5

POLARIZED ELECTRODE FOR ELECTRIC DOUBLE LAYER CAPACITOR, METHOD FOR PRODUCING THE SAME AND ELECTRIC DOUBLE LAYER CAPACITOR

TECHNICAL FIELD

The present invention relates to an electric double layer capacitor, and more particularly to a polarized electrode for an electric double layer capacitor having a low collector resistance and a high capacitance even when it is provided with an electrode active material layer containing more activated carbon, a method for producing the same and an electric double layer capacitor.

BACKGROUND ART (Background of the Art) An electric double layer capacitor is one kind of a condenser in which an electrode is formed by providing an electrode active material layer on a metal foil collector, and a pair of the electrodes is wound around disposing a separator therebetween. It has a small scale with a large capacitance, endures overcharging and discharging, and also the load imposed upon the environment is small from the viewpoint of materials used. Conventionally, an electric double layer capacitor is used for backup of a memory of an electronic appliance such as a video or an audio apparatus, as an auxiliary power source at the time of replacing the cell in a portable appliance, or in a clock or a stored power source of a displaying lamp appliance by using a solar cell. In recent years, by utilizing the small scale, large capacitance and large electric current, the electric double layer capacitor is expected as a starting power source for a small motor or a cell motor of an automobile or an electronic appliance. For providing larger capacitance, an electrode is demanded that can contain more electrode active material in a predetermined volume.

(Prior Art) Conventionally, an electric double layer capacitor is known in which a polarized electrode formed by mixing activated carbon with an electrically conductive auxiliary agent and a binder and applying the mixture onto a collector made of aluminum foil or copper foil followed by drying and pressing to provide a higher density, is cut into a predetermined size to form electrodes, and a pair of the electrodes are wound disposing a separator therebetween and put into a predetermined cell container with an electrolytic solution (for example, see Japanese Patent Application Laid-Open (JP-A) Nos. Hei. 03-280518, Hei. 08-293443 and Hei. 08-107045). However, reduction of the thickness of the collector is already near the limit. Also, when the application amount of activated carbon per unit area of the electrode is increased in order to put more activated carbon into a cell container having a predetermined volume, the electric conduction path cannot be sufficiently ensured, so that the resistance increases, leading to a drawback such that it is difficult to increase the application amount while leaving a part on which tabs for taking electricity out are to be welded.

Also, those in which an electrode active material layer is formed on both surfaces of a collector are known (for example, see JP-A Nos. Hei. 08-990056 and 2000-202358). However, the electrode active material layer is applied in a stripe form in longitudinal direction and, though the width direction only can be adjusted, a different pattern cannot be provided on the front and the back, and the pattern is a limited one. Further, there is a drawback such that, when high pressure is received at the time of pressing, wrinkles are generated due to the difference in the thickness between the coated section having a stripe form and the non-coated section.

Therefore, the present invention has been made in order to eliminate such problems. An object thereof is to provide an electric double layer capacitor electrode having a low collector resistance and a high capacitance even when it is provided with an electrode active material layer containing more activated carbon, by forming the electrode active material layer in a pattern, as well as a method for producing the same and an electric double layer capacitor.

DISCLOSURE OF THE INVENTION

In order to solve the aforementioned problems, a polarized electrode for an electric double layer capacitor according to the invention of Claim 1 is a polarized electrode having an electrode active material layer provided at least on one surface of a collector in a pattern form in an electric double layer capacitor having at least a pair of polarized electrodes, a separator and an electrolytic solution sealed in a container, wherein the pattern form is arranged intermittently at least in the longitudinal direction of the collector. Further, a polarized electrode for an electric double layer capacitor according to the invention of Claim 2 is such that the electrode active material layer in a pattern form is provided on both surfaces of the collector, the pattern form being the same on both surfaces or different on each surface. According to the present invention, an electrode active material layer having a pattern form is provided on one surface or on both surfaces of a collector, and the pattern form is composed of the electrode active material layer arranged intermittently at least in the longitudinal direction of the collector. The form of the pattern and/or the interval of the pattern and/or the positional relationship may be the same or different on the front surface and on the back surface. As a result of this, a polarized electrode for an electric double layer capacitor can be provided in which the amount of electrode active material per unit area can be increased, and further, the electric conduction path can be ensured with no increase in resistance because wrinkles are not generated even under high pressure at the time of pressing for making it have a higher density, and tabs can be welded to the periodic non-coated section.

A method for producing a polarized electrode for an electric double layer capacitor according to the invention of Claim 3 is a method for producing a polarized electrode in an electric double layer capacitor having at least a pair of polarized electrodes, a separator and an electrolytic solution sealed in a container, comprising at least steps of: a) providing a collector; b) providing an electrode active material composition; c) forming an electrode active material composition layer in a predetermined pattern form by applying the electrode active material composition on the collector so that a coated section having the electrode active material composition coated on the collector and a non-coated section not having the electrode active material composition coated on the collector are provided in a predetermined period in a running direction of the collector, and drying the electrode active material layer; d) pressing the collector on which the electrode active material layer is formed in the pattern form; and e) slitting the collector after pressing in a predetermined size. A method for producing a polarized electrode for an electric double layer capacitor for producing a polarized electrode in an electric double layer capacitor having at least a pair of polarized electrodes, a separator and an electrolytic solution sealed in a container, the polarized electrode being formed with an electrode active material layer provided at least on one surface of a collector in a pattern form, wherein the pattern form is at least formed intermittently in longitudinal direction of the collector, comprising at least steps of: a)

providing the collector; b) providing an electrode active material composition; c') forming the electrode active material composition layer in a predetermined pattern form by applying the electrode active material composition on the collector so that a coated section having the electrode active material composition coated on the collector and a non-coated section not having the electrode active material composition coated on the collector are provided in a predetermined period in a running direction of the collector by a die-coating method in which a die head supplies the electrode active material composition intermittently, and drying the electrode active material layer; d) pressing the collector on which the electrode active material layer is formed in the pattern form; and e) slitting the collector after pressing in a predetermined size. A method for producing a polarized electrode for an electric double layer capacitor such that the c') step comprises the step of: c'') forming the electrode active material composition layer in a predetermined form by applying the electrode active material composition on the collector in such a manner that the electrode active material composition is continuously supplied to a die head while the die head moves away and approaches the collector and/or the collector moves away and approaches the die head so that a coated section having the electrode active material composition coated on the collector and a non-coated section not having the electrode active material composition coated on the collector are provided in a predetermined period in a running direction of the collector, and drying the electrode active material layer. A method for producing a polarized electrode for an electric double layer capacitor for producing a polarized electrode in an electric double layer capacitor having at least a pair of polarized electrodes, a separator and an electrolytic solution sealed in a container, the polarized electrode being formed with an electrode active material layer provided at least on one surface of a collector in a pattern form, wherein the pattern form is at least formed intermittently in longitudinal direction of the collector, comprising at least steps of: a) providing the collector; b) providing an electrode active material composition; c''') forming the electrode active material composition layer in a predetermined pattern form wherein a coated section and a non-coated section of the electrode active material composition is provided on the collector so that the coated section and the non-coated section are arranged in a predetermined period in a running direction of the collector in such a manner that while the electrode active material composition is supplied on a first roll followed by scraping with the use of a comma head to obtain a predetermined amount and the electrode active material composition of the predetermined amount is transferred on the collector running along a second roll by a comma reverse method, the second roll moves away and approaches the first roll, and drying the electrode active material layer; d) pressing the collector on which the electrode active material layer is formed in the pattern form; and e) slitting in a predetermined size. According to the present invention, a method for producing a polarized electrode for an electric double layer capacitor can be provided in which a brittle composition having a high viscosity can be applied in a large application amount and also in a pattern form, and can be made to have a higher density through pressing by applying an existing intermittent application method such as a die-coating method or a comma reverse method.

An electric double layer capacitor has at least a pair of polarized electrodes for the electric double layer capacitor, a separator and an electrolytic solution sealed in a container. An electric double layer capacitor has at least a pair of polarized electrodes produced by the method for producing a polarized electrode for an electric double layer capacitor, a separator and an electrolytic solution sealed in a container. According to the present invention, more activated carbon can be put into a cell container having a predetermined volume, and an electric double layer capacitor can be provided having less resistance with a plurality of tab terminals.

BRIEF DESCRIPTION OF THE DRAWINGS

In the accompanying drawings.

Here, the meanings of the symbols in each Figure are as follows:

polarized electrode (1); collector (11); electrode active material layer (13, 13a, 13b); tab (15); electrode active material layer composition (23); electrode active material layer (in a pattern form) (23a); flow of electrode active material composition at the time of application (25a); flow of electrode active material composition at the time of non-application (25b); die head (31); die lip (33); backup roll (35, 45); switching valve (37); running (flow) direction (38); ink supplying pump (39); coating roll (41); comma head (43); moving-away and approaching operation (47); clearance between the die lip and the collector (backup roll) (48).

BEST MODE FOR CARRYING OUT THE INVENTION

Embodiments of the present invention will be described in detail with reference to the drawings.

Figure 1:
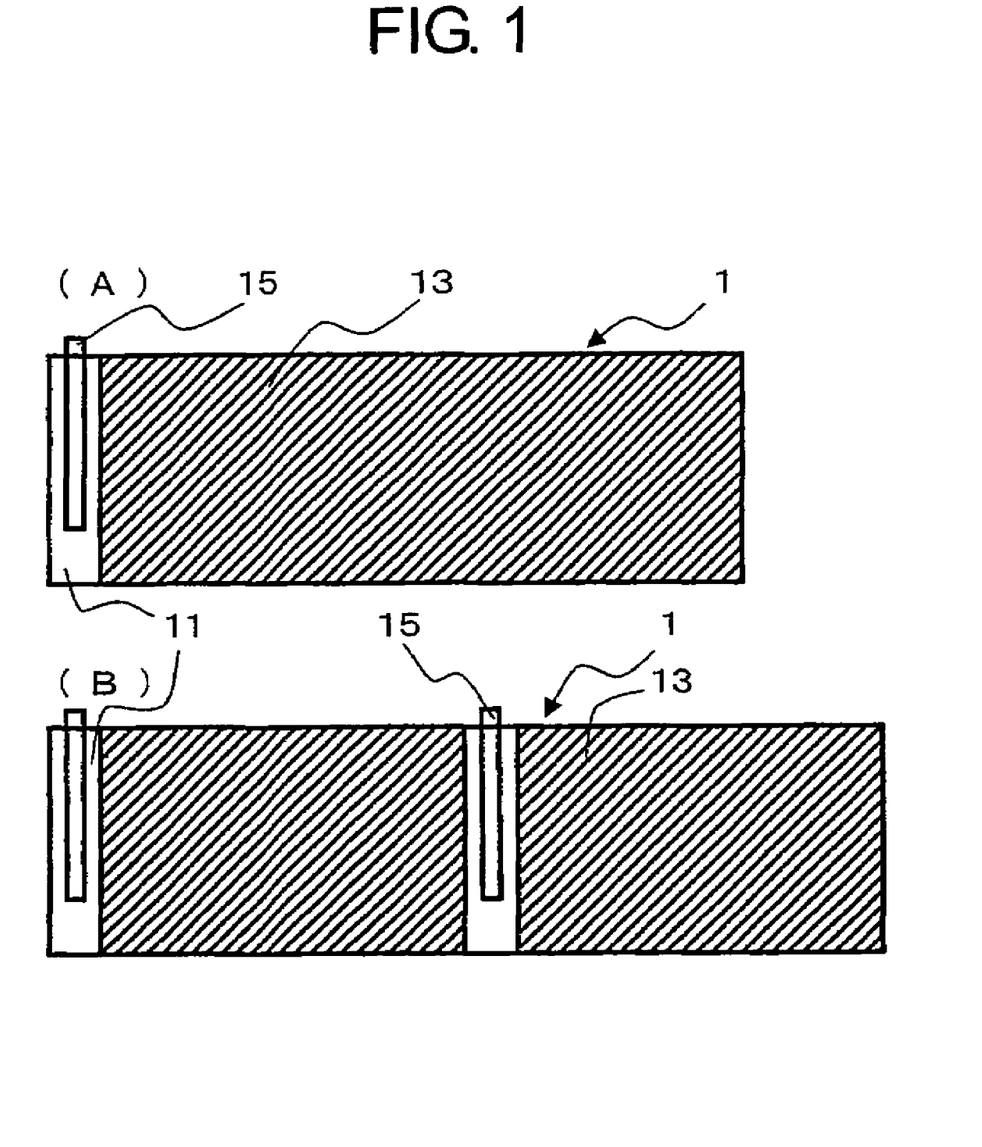
FIG. 1 schematically shows a plan view of a polarized electrode for an electric double layer capacitor of the present invention.

FIG. 1 schematically shows a plan view of a polarized electrode for an electric double layer capacitor of the present invention.

Figure 2:
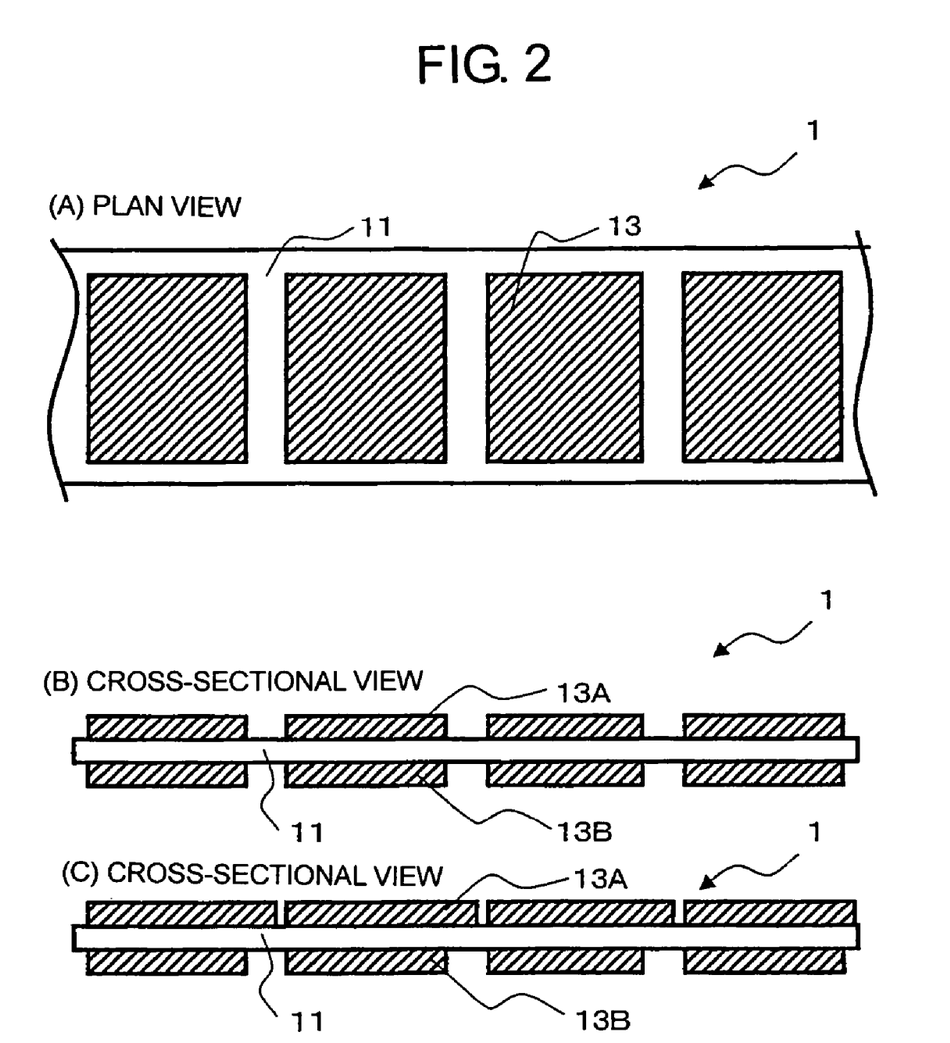
FIG. 2 schematically shows a plan view and cross-sectional view of the polarized electrode for the electric double layer capacitor in a coated state.

FIG. 2 schematically shows a plan view and cross-sectional view of the polarized electrode for the electric double layer capacitor in a coated state.

(Basic Construction) As shown in FIG. 1, the polarized electrode 1 for an electric double layer capacitor of the present invention is constructed in such a manner that an electrode active material layer 13 is formed in a pattern form on a collector 11, and a tab 15 serving as a terminal is provided on the part where the electrode active material layer 13 is not applied and the collector 11 is exposed. In FIG. 1(A), one electrode active material layer 13 and one tab are provided, and in FIG. 1(B), two electrode active material layers 13 and two tabs are exemplified; however, the electrode active material layers and tabs may be provided in a plural number exceeding two.

FIG. 2 is a polarized electrode 1 for an electric double layer capacitor of the present invention in a coated state, where a coated section and a non-coated section are provided in a predetermined period in the running direction of the collector. FIG. 2(A) shows a plan view in the coated state, where the electrode active material layer 13 is formed repeatedly in a pattern form on the collector 11. It is sufficient that the electrode active material layer 13 of the polarized electrode 1 is provided at least on one surface of the collector 11, and may be provided on one surface or on both surfaces. The pattern form of the electrode active material layer 13 may be the same on both surfaces or different on each surface. FIG. 2(B) is a cross-sectional view of the coated state, where the same pattern is provided on both surfaces, and FIG. 2(C) is a cross-sectional view of the coated state where the pattern is different on each of the two surfaces.

In the present invention, since the electrode active material composition is applied on the collector so that the coated section and the non-coated section may be provided in a predetermined period in the running direction of the collector, a brittle composition having a high viscosity can be applied in a large application amount. The amount of the electrode active material layer on the collector after drying is preferably 10 to 150 $g/m^2$, more preferably 20 to 100 $g/m^2$, per one surface.

Although not shown in the drawings, the electric double layer capacitor of the present invention has at least a pair of the polarized electrodes for an electric double layer capacitor, a separator and an electrolytic solution sealed in a container. Typically, a capacitor element formed by superposing and winding a first polarized electrode, a first separator, a second polarized electrode and a second separator in this order is sealed in a container together with an electrolytic solution, and a terminal is taken out from each tab 15 of the first polarized electrode and the second polarized electrode.

(Production Method) In the method for producing a polarized electrode for an electric double capacitor of the present invention, as a method for applying an electrode active material composition on a collector, one can use a die-coating method in which the electrode active material composition is supplied intermittently to a die head, a die-coating method in which the electrode active material composition is supplied continuously to a die head and the die head and/or the collector are made to move away or approach each other, a comma reverse method in which a second roll is made to move away or approach a first roll in transferring a predetermined amount of the electrode active material composition to a collector running along on the second roll, or the like. By the methods, a coated section having the electrode active material composition applied on the collector and a non-coated section not having the electrode active material composition applied on the collector can be provided in a predetermined period in the running direction of the collector, so that an electrode active material layer can be formed in a predetermined pattern form.

POINTS OF THE INVENTION

The polarized electrode 1 for an electric double layer capacitor of the present invention is such that an electrode active material layer is formed in a pattern form on one surface or on both surfaces of a collector, and the pattern form is composed of the electrode active material layer arranged intermittently at least in longitudinal direction of the collector. The form of the pattern and/or the interval of the pattern and/or the positional relationship may be the same or different on the front surface and on the back surface. As a result of this, the amount of electrode active material per unit area can be increased, and further, the electric conduction path can be ensured with no increase in resistance because wrinkles are not generated even under high pressure at the time of pressing for making it have a higher density, and tabs can be welded to the periodic non-coated section.

The electric double layer capacitor of the present invention has a high capacitance because more activated carbon can be put into a container having a predetermined volume, and the collector resistance by the tab terminals is small.

According to the method for producing a polarized electrode for an electric double layer capacitor of the present invention, a brittle composition having a high viscosity can be applied in a large application a mount and also in a pattern form by applying an existing die-coating method or comma reverse method.

(Material of Polarized Electrode) The polarized electrode 1 for an electric double layer capacitor of the present invention is constructed in such a manner that an electrode active material layer 13 is formed in a pattern form on a collector 11, and a tab 15 serving as a terminal is provided on the part where the collector 11 is exposed.

The collector 11 may be made of a known metal foil such as Al, Cu, Cr, Ni, Ag, or Au, or may be a foil made of the alloy or plural layers of these, and also an etching treatment may be performed on the surface. The thickness thereof is 2 to 00 μm, preferably 8 to 75 μm, more preferably 10 to 50 μm. As long as it has a mechanical strength to withstand the production steps, the thinner, the better, and practically the thickness is typically within the above range.

The electrode active material layer 13 is made of activated carbon having a large specific surface area, an electrically conductive auxiliary agent and a binder, where various additives may be added in accordance with the needs within the range that does not affect the functions.

The activated carbon preferably has an average particle size of about 0.5 to 30 μm and a BET specific surface area of 500 to 3,000 $m^2$, and may be made of a single kind of activated carbon or a mixture of plural different kinds of activated carbon. The activated carbon may be in a powder form or in a particle form, and may be selected from known activated carbons made from coconut shell series, wooden series, coal series, resin series and the like as a material.

The electrically conductive auxiliary agent may be acetylene black, carbon carbon, natural graphite, artificial graphite or the like, and these may be used either alone or as a mixture of plural kinds.

The binder may be a cellulose series such as carboxymethylcellulose (CMC) or the like, a fluorine series resin such as polytetrafluoroethylene (PTFE), polyvinylidene fluoride (PVDF) or the like, a rubber series such as polyvinyl alcohol (PVA), polyvinyl acetal, polyvinyl pyrrolidone, styrene-butadiene rubber or the like, and these maybe used either alone or as a mixture of plural kinds.

The activated carbon, electrically conductive auxiliary agent and the binder are dispersed or dissolved in a solvent to make an electrode active material composition 23 (also referred to as slurry or ink), which is applied and dried by a method to be hereinafter described to form an electrode active material layer 13. The solvent may be an organic solvent such as N-methylpyrrolidone, toluene, methyl alcohol, ethyl alcohol methyl ethyl ketol, isopropyl alcohol or the like, or water, and these may be used either alone or as a mixture of plural kinds.

The separator is not particularly limited and may be known mixed paper of Manila hemp or glass fiber, and porous film of polypropylene, polyethylene or the like.

The electrolytic solution may be a known one and is, for example, one obtained by dispersing or dissolving an electrolyte such as lithium salt, $(CH_3)_4N$ salt, $(C_2H_5)_4N$ salt, or the like of $BF_4$, $PF_6$, $ClO_4$, or the like into a solvent such as propylene carbonate, ethylene carbonate, tetrahydrofuran, dimethoxyethane or the like.

The tab is a tab for drawing electricity out from the polarized electrode and may be a known tab member. The tab may be fixed to the surface where the collector is exposed, by, for example, caulking or the like with a battledore-shaped part of the tab member.

The container is a container for sealing the capacitor element, which is formed by superposing the first polarized electrode, the first separator, the second polarized electrode and the second separator in this order, and the electrolytic solution, and may be a known container. In the container, a terminal is taken out from each tab 15 of the first polarized electrode and the second polarized electrode.

The electric double layer capacitor of the present invention has at least a pair of the polarized electrodes for an electric double capacitor, a separator and an electrolytic solution sealed in a container. Typically, a capacitor element formed by superposing and winding a first polarized electrode, a first separator, a second polarized electrode and a second separator in this order is sealed in a container together with an electrolytic solution, and a terminal is taken out from each tab 15 of the first polarized electrode and the second polarized electrode.

(Production Method) Next, a method for producing a polarized electrode for an electric double layer capacitor of the present invention will be described. In any of the application methods of the present invention, the collector 11 is handled as a long rolled body (referred to as web). When the electrode active material composition is to be applied on both surfaces of the collector, first, an electrode active material layer (front surface) 13A is formed on one surface thereof while drawing the rolled body out and is temporarily wound into a roll form. Subsequently, while drawing from the web out again, an electrode active material layer (back surface) 13B is formed this time on the other surface and is wound up into a rolled body. Alternatively, one may employ what those skilled in the art call an in-line method in which, after an electrode active material layer (front surface) 13A is formed on one surface, an electrode active material layer (back surface) 13B may be formed on the other surface successively without winding. The web is pressed and cut into a predetermined size, and tabs are fixed. The present invention is an application method characterized in that the electrode active material layer (front surface) 13A is provided in a pattern form, in particular, that a coated section and a non-coated section are provided in a predetermined period in the running direction of the collector.

(Coating Method) First, it is the production method according to the invention of Claim 3.

a) step of providing a collector

A known and commercially available metal foil such as Al, Cu, Cr, or Ni made by a pressing or plating method such as described above is prepared as the collector 11 in a web form.

b) step of providing an electrode active material composition

The electrode active material composition is composed of activated carbon, electrically conductive auxiliary agent, and a binder as described above. The larger the amount of activated carbon is, the better it is, because the cell capacitance can be increased. The smaller the amount of electrically conductive auxiliary agent is, the better it is as long as the electrical conductivity can be ensured. The smaller the amount of binder is, the smaller the resistance will be. However, in view of the total integrity, the amount ratio is preferably activated carbon: electrically conductive auxiliary agent: binder=about 80 to 99 mass %: 0.5 to 10 mass %: 0.5 to 10 mass %. A solvent is added to these to disperse or dissolve so that the ratio of the solid components will be 15 to 50 mass % so as to prepare the electrode active material composition 23 (also referred to as ink). The method for dispersion or dissolution is not particularly limited, and one can apply, for example, a kneading or dispersing machine, for example, an attritor, a high-speed impeller dispersing machine, a disper, a high-speed mixer, a ribbon blender, a co-kneader, an intensive mixer, a tumbler, a blender, a disperser, an ultrasonic dispersing machine or the like. Further, the viscosity of the electrode active material composition 23 is preferably 1,000 to 30,000 mPa·s at 25° C. so as to be suitable for the application method to be hereinafter described.

c) step of forming an electrode active material composition layer in a predetermined pattern form by applying the electrode active material composition on the collector so that a coated section having the electrode active material composition coated on the collector and a non-coated section not having the electrode active material composition coated on the collector are provided in a predetermined period in a running direction of the collector, and drying the electrode active material layer.

One can apply various intermittent application methods that can provide the coated section and the non-coated section in a predetermined period in the running direction of the collector. Specifically, detailed description will be given with the production methods of the invention.

In the present invention, since the electrode active material composition is applied on the collector so as to provide a coated section and a non-coated section in a predetermined period in the running direction of the collector, a brittle composition having a high viscosity can be applied in a large application amount. The amount of the electrode active material layer on the collector after drying is preferably 10 to 150 g/m2, more preferably 20 to 100 g/m$^2$, per one surface.

d) step of pressing the collector having the electrode active material layer formed in the pattern form (pressing process) The obtained electrode active material layer is subjected to a pressing process. By the pressing process, the homogeneity of the polarized electrode is improved, and by making the layer into a thinner layer, the area of the polarized electrode that can be wound up in the capacitor can be increased. By performing the pressing process on a pair of the polarized electrodes that give a great influence on the performance of the capacitor, the capacitor can be made to have a higher capacitance. The pressing process is carried out, for example, with the use of a metal roll, an elastic roll, a heated roll, a sheet pressing machine or the like. The pressing pressure is typically 4,903 to 73,550 N/cm$^2$ (500 to 7,500 kgf/cm$^2$), preferably 29,420 to 49,033 N/cm$^2$ (3,000 to 5,000 kgf/cm$^2$). If the pressing pressure is lower than 4,903 N/cm$^2$ (500 kgf/cm$^2$), it is difficult to obtain the homogeneity of the electrode active material layer, while if the pressing pressure is higher than 73,550 N/cm$^2$ (7,500 kgf/cm$^2$), the polarized electrode itself including the collector may be broken in some cases. The electrode active material layer maybe made to have a predetermined thickness by one-time pressing, or may be pressed for several times for the purpose of improving the homogeneity and/or making the layer have a higher density.

When the pressure of the rolling press is to be controlled by the line pressure, the line pressure is adjusted in accordance with the diameter of the pressing roll. Typically, the line pressure is set to be 4.9 to 19,614 N/cm (0.5 kgf/cm to 2 tf/cm). Pressing for several times or multi-layer pressing may be carried out in consideration of the thickness of the pole plate after pressing. Further, during the drying of the mixture layer, the surface of the electrode active layer may be flattened by lightly press-bonding a film having a flat surface such as polyethylene terephthalate film or the like on the surface thereof and peeling the film again.

e) Step of Slitting in a Predetermined Size (slitting) The shape of the polarized electrode is narrow and long and, for example, in the case of an electrode for backup of a computer, the short side width is 7 to 300 mm, and the length of the long side is about 50 to 1,000 mm. For a motor, the short side width is about 50 to 500 mm, and the length of the long side is about 100 to 50,000 mm. For this reason, in the step of producing a polarized electrode described above, the plate is processed in a web form having a large width and a large length such that plural pieces can be cut out with respect to both width and length, so that, at the stage when the pressing process is finished, the plate is cut into predetermined width and length or into a predetermined shape to form polarized electrodes.

(Die-Coating Method (Method of Intermittently Supplying the Electrode Active Material Composition (Ink)))

First, it is the production method of the invention.

The production method is such that the following step of c') is carried out in place of the c) step. The other steps are similar to those in the invention, so that only that step will be described.

c') step of forming the electrode active material composition layer in a predetermined pattern form by applying the electrode active material composition on the collector so that a coated section having the electrode active material composition coated on the collector and a non-coated section not having the electrode active material composition coated on the collector are provided in a predetermined period in a running direction of the collector by a die-coating method in which a die head supplies the electrode active material composition intermittently, and drying the electrode active material layer.

Figure 3:
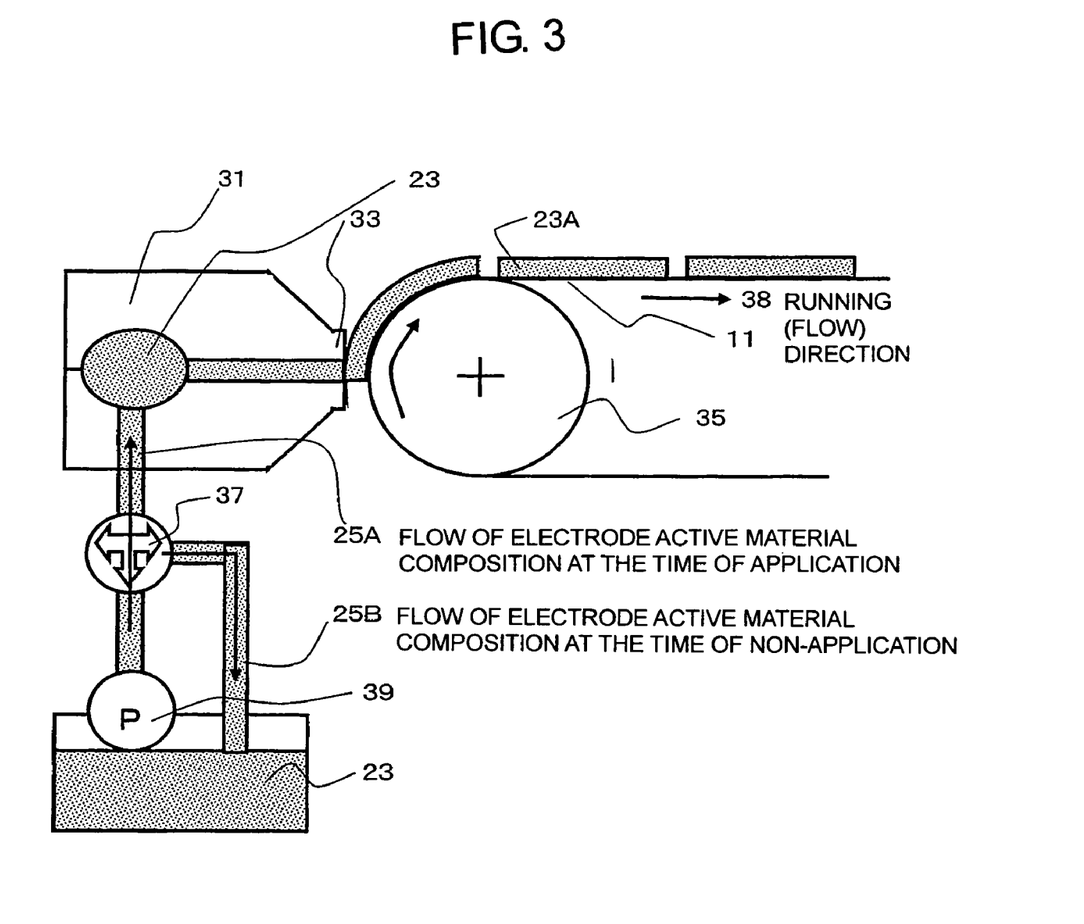
FIG. 3 is a cross-sectional view showing one Example of an essential part of a die-coating method of the present invention.

FIG. 3 is a cross-sectional view showing one Example of an essential part of a die-coating method of the present invention.

As shown in FIG. 3, the die-coating method (also referred to as a slit-die method) of the present invention is such that there is a liquid reservoir section in the inside of a die head 31, and the electrode active material composition 23 is ejected in a substantially uniform thickness from a die lip 33 provided at the tip end of the die head 31 by enlarging the width to a predetermined width after storing a constant amount of the electrode active material composition 23. By disposing the die head 31 so that the clearance between the tip end of the die lip 33 and the collector 11 will be maintained to be a constant interval, the electrode active material composition 23 can be uniformly applied on the collector 11. On the other hand, the collector 11 is wound around a backup roll 35, and is running by the driving of the backup roll 35 or another driving force. The running direction 38 will be regarded as the collector 11 running direction. The electrode active material composition 23 ejected from the die lip 33 is transferred onto the collector 11 by being brought into contact with the running collector 11.

During this, by intermittently supplying the electrode active material composition 23 to the die head 31, the electrode active material composition 23 can be applied onto the collector 11 so as to provide a coated section and a non-coated section in a predetermined period in the running direction of the collector so as to apply the electrode active material composition 23 in a pattern form. The method of intermittently supplying the electrode active material composition 23 is such that the electrode active material composition 23 is supplied from an ink pan filled with the electrode active material composition 23 to the die head 31 via a switching valve 37 by an ink supplying pump 39. Here, at the time of application, the electrode active material composition 23 can be supplied to the die head 31 as a flow 25A of the electrode active material composition at the time of application by the switching valve 37. At the time of non-application, the switching valve 37 is switched to return the electrode active material composition 23 to the ink pan as a flow 25B of the electrode active material composition at the time of non-application, so that the electrode active material composition is not supplied to the die head 31.

In this manner, with the electrode active material composition 23, an electrode active material composition (pattern form) 23A is formed in a pattern form on the collector 11. The shape of the pattern may be set by suitably selecting the rate of intermittent supply, the running speed of the collector 11, and the predetermined width of the die head 31. Also, the application amount of the electrode active material composition 23 may be set by suitably selecting the supply amount of the electrode active material composition 23, the running speed of the collector 11, and the interval between the die lip 33 and the collector 11. Typically, the interval between the die lip 33 and the collector 11 is 50 to 500 μm, and the clearance of a lip land to the die lip 33 is about 100 to 1,000 μm, preferably 200 to 600 μm, in order to enlarge the width of the electrode active material composition 23 in the die head 31 to a predetermined width in a substantially uniform thickness.

The electrode active material composition (pattern form) 23A applied on the collector 11 is dried in a drying section not shown. As a heat source in the drying, one can use hot air, infrared rays, far infrared rays, microwaves, high-frequency wave, or a combination thereof. The drying may be carried out with the heat released by heating the metal roller or metal sheet which supports or presses the collector in the drying step.

(Die-Coating Method (Method of Making the Backup Roll Move Away and Approach))

The production method of the invention is such that the following step of c″) is carried out in place of the c') step of the invention. The other steps are similar to those in the invention, so that only that step will be described.

c″) step of forming the electrode active material composition layer in a predetermined pattern form by applying the electrode active material composition on the collector in such a manner that the electrode active material composition is continuously supplied to a die head while the die head moves away and approaches the collector and/or the collector moves away and approaches the die head so that a coated section having the electrode active material composition coated on the collector and a non-coated section not having the electrode active material composition coated on the collector are provided in a predetermined period in a running direction of the collector, and drying the electrode active material layer.

Figure 4:
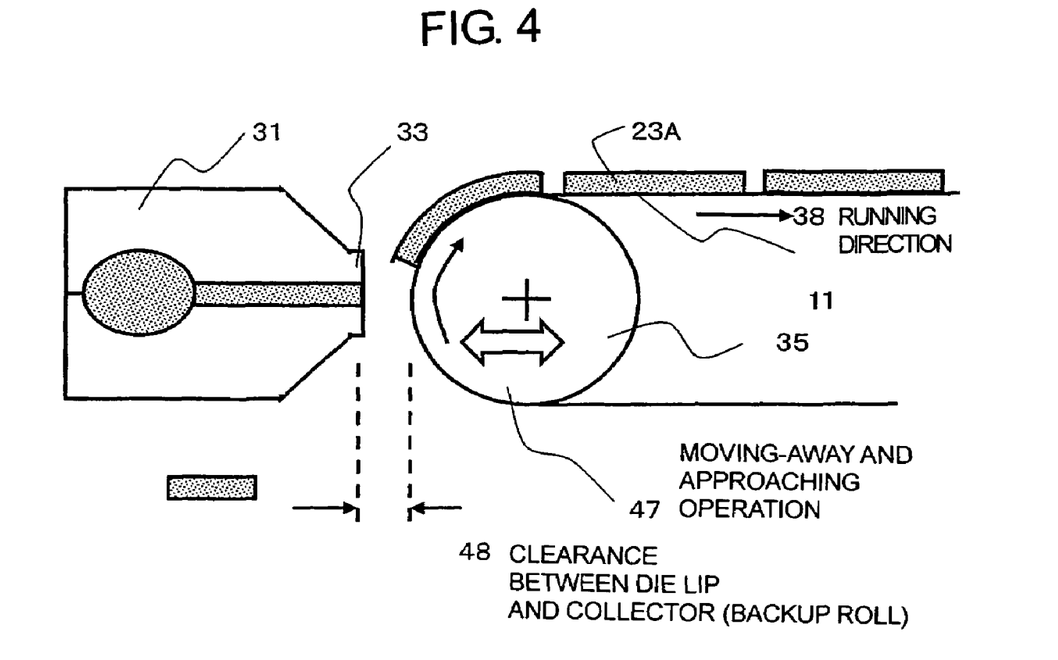
FIG. 4 is a cross-sectional view showing another Example of an essential part of a die-coating method of the present invention.

FIG. 4 is a cross-sectional view showing another Example of an essential part of a die-coating method of the present invention.

The collector 11 is wound around a backup roll 35, and is running in the running direction 38 by the driving of the backup roll 35 or another driving force. The backup roll 35 is constructed to be capable of performing moving-away and approaching operations 47 from the die lip 33. Here, when the backup roll 35 moves away, the collector 11 running thereon is separated from the die lip 33, so that the electrode active material composition 23 cannot be transferred onto the collector 11, thereby forming a non-coated section. When the backup roll 35 approaches, the collector 11 running thereon approaches the die lip 33, so that the electrode active material composition 23 is transferred onto the collector 11, thereby forming a coated section. The intermittent application can also be carried out in a similar manner by constructing the die head 31 to be capable of performing moving-away and approaching operations from the backup roll 35.

The shape of the pattern may be set by suitably selecting the rate of moving away and approaching of the backup roll 35, the running speed of the collector 11, and the predetermined width of the die head 31. Also, the application amount of the electrode active material composition 23 may be set by suitably selecting the supply amount of the electrode active material composition 23, the running speed of the collector 11, and the clearance (48) between the die lip 33 and the collector (backup roll).

(Comma Reverse Method)

The production method of the invention is such that the following step of c''') is carried out in place of the c) step of the invention. The other steps are similar to those in the invention, so that only that step will be described.

c''') step of forming the electrode active material composition layer in a predetermined pattern form wherein a coated section and a non-coated section of the electrode active material composition are provided on the collector so that the coated section and the non-coated section are arranged in a predetermined period in a running direction of the collector in such a manner that while the electrode active material composition is supplied on a first roll followed by scraping with the use of a comma head to obtain a predetermined amount and the electrode active material composition of the predetermined amount is transferred on the collector running along a second roll by a comma reverse method, the second roll moves away and approaches the first roll, and drying the electrode active material layer.

Figure 5:
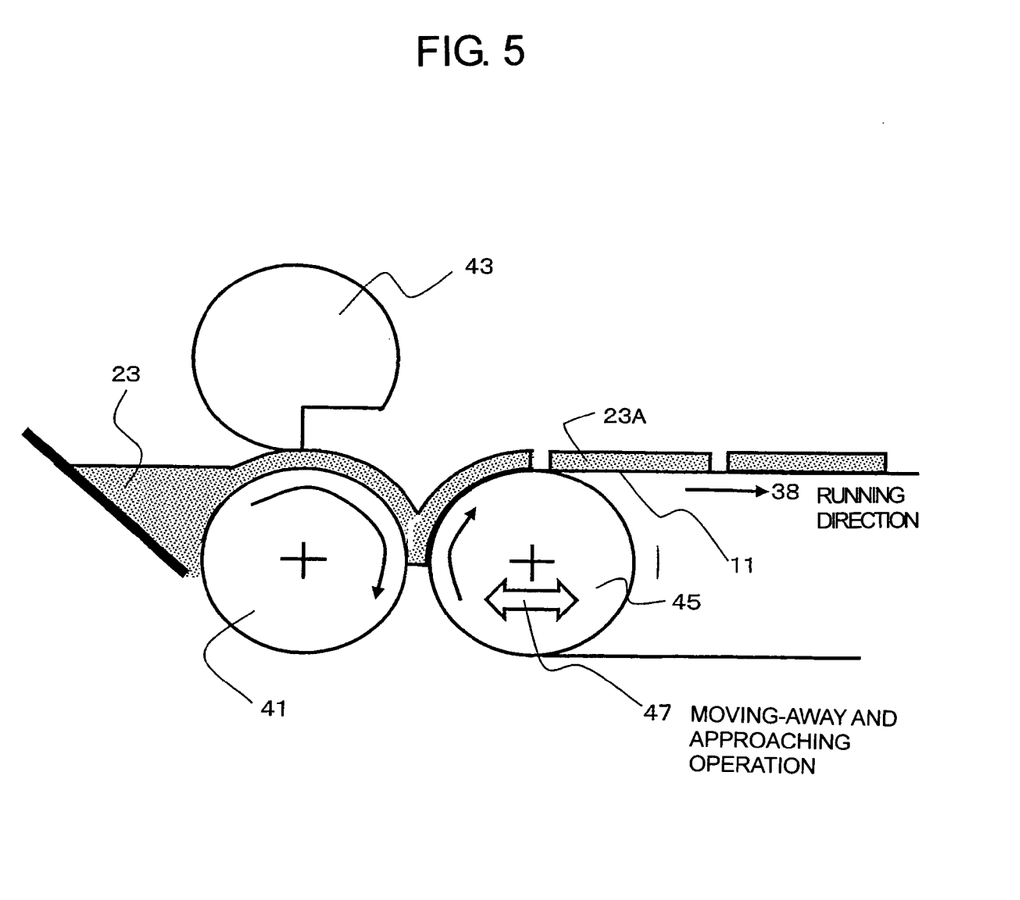
FIG. 5 is a cross-sectional view showing one Example of an essential part of a comma reverse method of the present invention.

FIG. 5 is a cross-sectional view showing one Example of an essential part of a comma reverse method of the present invention.

As shown in FIG. 5, the comma reverse method of the present invention is such that an ink reservoir between a fixed dam and a coating roll 41 is filled with an electrode active material composition 23 (ink), and the electrode active material composition 23 is transferred onto the coating roll 41 that rotates by a driving force not shown, and is scraped out with the use of a comma head 43 having a predetermined clearance to provide a substantially uniform and predetermined thickness. On the other hand, the collector 11 is wound around a backup roll 45, and is running (reverse) in the direction opposite to the rotation direction of the coating roll 41 by the driving of the backup roll 45 or another driving force. The running direction 38 will be regarded as the collector 11 running direction. The electrode active material composition 23 having the predetermined thickness is transferred onto the collector 11 when brought into contact with the running collector 11.

The backup roll 45 is constructed to be capable of performing moving-away and approaching operations 47 from the coating roll 41. Here, when the backup roll 45 moves away, the collector 11 running thereon is separated from the coating roll 41, so that the electrode active material composition 23 cannot be transferred onto the collector 11, thereby forming a non-coated section. When the backup roll 45 approaches, the collector 11 running thereon approaches the coating roll 41, so that the electrode active material composition 23 is transferred onto the collector 11, thereby forming a coated section. The intermittent application can also be carried out in a similar manner by constructing the die head 31 to be capable of performing moving-away and approaching operations from the backup roll 45.

The shape of the pattern may be set by suitably selecting the rate of moving away and approaching of the backup roll 45, the predetermined width provided by right and left dams of the ink dam, and the running speed of the collector 11. Also, the application amount of the electrode active material composition 23 may be set by suitably selecting the clearance between the coating roll 41 and the comma head 43, and the running speed difference between the coating roll 41 and the backup roll 45 (collector 11) if the composition of the electrode active material composition 23 is constant.

(Thickness of Electrode Active Material Layer) In any of the application methods, when the thickness of the electrode active material layer is small, the cell capacitance decreases because the amount of activated carbon that can be put into a cell container having a predetermined volume decreases. Also, when the thickness of the electrode active material layer is large, the resistance increases because the distance from the collector increases. Therefore, the thickness of the electrode active material layer is preferably 15 μm to 210 μm, more preferably 30 μm to 140 μm. The length of the coated section and the non-coated section is not particularly limited, however, the length of the coated section is preferably about 10 mm to 50 m, and can be suitably selected in accordance with the required capacitance and the size of the cell container. The length of the non-coated section may be such that the tab member can be attached, and is preferably about 5 to 500 mm.

Also, a coated section having a pattern form (electrode active material layer 13A) may be provided on one surface of the collector 11, and further a coated section having a pattern form (electrode active material layer 13B) may be provided on the other surface. The method of application on the front surface and the back surface may be any method of the present invention, and also may be a combination of different methods. The form of the pattern and/or the interval of the pattern and/or the positional relationship may be the same or different on the front surface and on the back surface. The form of the pattern and/or the interval of the pattern and/or the positional relationship is preferably adjusted by performing application work while measuring the length with a sensor and making occasional corrections so that they will be appropriate.

The capacitance of the electric double layer capacitor per volume can be improved by providing the electrode active material layer 13A and the electrode active material layer 13B on both surfaces of the collector 11 and pressing.

EXAMPLES

Example 1

Die-Coating Method, Polarized Electrode Having the Same Pattern on the Front and Back Surfaces A solid component composed of 80 mass % of activated carbon (BET specific surface area 2,000 $m^2/g$, average particle size 8 μm), 10 mass % of acetylene black (electrically conductive auxiliary agent), 2 mass % of CMC (binder), and 8 mass % of styrene butadiene rubber was dispersed or dissolved by adding a water solvent so that the solid component would be 35 mass % to prepare an electrode active material composition (ink).

The electrode active material composition (ink) was continuously applied and dried as a web on one surface (assumed as the front surface) of an aluminum foil having a thickness of 30 μm as a collector so as to form a repeated pattern with the width of the coated section being 500 mm, the running direction length of the coated section being 500 mm, and the running direction length of the non-coated section (where the collector is exposed) being 50 mm by the die-coating method (method of intermittently supplying the electrode active material composition (ink)) described in the specification so that the application amount would be 50 g/m².

The electrode active material composition (ink) was continuously applied and dried on the back surface of the web so as to form a repeated pattern with the width of the coated section being 500 mm, the running direction length of the coated section being 500 mm, and the running direction length of the non-coated section (where the collector is exposed) being 50 mm by the die-coating method (method of intermittently supplying the electrode active material composition (ink)) in coincidence with the position on the front surface so that the application amount would be 50 g/m².

The web was pressed by a roll pressing machine so that the thickness of the coated section on both surfaces would be 100 μm. The web was stamped out in a predetermined dimension to form polarized electrodes.

Example 2

Die-Coating Method, Polarized Electrode Having Different Patterns on the Front and Back Surfaces A polarized electrode was obtained in the same manner as in Example 1 except that the running direction length of the coated section on the back surface would be 400 mm, and the running direction length of the non-coated section (where the collector is exposed) would be 150 mm, that only the start of the coated section was made to coincide with the position on the front surface, and that the die-coating method (method of allowing the backup roll to move away and approach) was used as an application method.

Comparative Example 1

Die-Coating Method, Polarized Electrode Obtained by Tape-Peeling After Uniform Application A polarized electrode was obtained in the same manner as in Example 1 except that, though the die-coating method was used as an application method, after the electrode active material composition was applied on the entire front surface of a collector in the running direction, a non-coated section was provided by a known tape-peeling method so as to form a repetition with a coated section having a running direction length of 500 mm followed by the non-coated section having a running direction length of 50 mm (where the collector is exposed), and that the coated section and the non-coated section were provided also on the back surface of the web in the same manner.

Example 3

Comma Reverse Method, Polarized Electrode Having the Same Pattern on the Front and Back Surfaces A solid component composed of 80 mass % of activated carbon (BET specific surface area 2,000 m²/g, average particle size 8 μm), 10 mass % of acetylene black (electrically conductive auxiliary agent), 2 mass % of CMC (binder), and 8 mass % of styrene butadiene rubber was dispersed or dissolved by adding a water solvent so that the solid component would be 35 mass % to prepare an electrode active material composition (ink).

The electrode active material composition (ink) was continuously applied and dried as a web on one surface (assumed as the front surface) of an aluminum foil having a thickness of 30 μm as a collector so as to form a repeated pattern with the width of the coated section being 500 mm, the running direction length of the coated section being 500 mm, and the running direction length of the non-coated section (where the collector is exposed) being 50 mm by the comma reverse method (intermittent application method) described in the specification so that the application amount would be 50 g/m².

The electrode active material composition (ink) was continuously applied and dried on the back surface of the web so as to form a repeated pattern with the width of the coated section being 500 mm, the running direction length of the coated section being 500 mm, and the running direction length of the non-coated section (where the collector is exposed) being 50 mm by the comma reverse method (intermittent application method) in coincidence with the position on the front surface so that the application amount would be 50 g/m².

The web was pressed by a roll pressing machine so that the thickness of the coated section on both surfaces would be 100 μm. The web was stamped out in a predetermined dimension with 550 mm in the running direction×50 mm in the width direction to form polarized electrodes.

Example 4

Comma Reverse Method, Polarized Electrode Having Different Patterns on the Front and Back Surfaces A polarized electrode was obtained in the same manner as in Example 3 except that the running direction length of the coated section on the back surface would be 400 mm, and the running direction length of the non-coated section (where the collector is exposed) would be 150 mm, and that only the start of the coated section was made to coincide with the position on the front surface.

Comparative Example 2

Comma Reverse Method, Polarized Electrode Obtained by Tape-Peeling After Uniform Application A polarized electrode was obtained in the same manner as in Example 3 except that, though the comma reverse method was used as an application method, after the electrode active material composition was applied on the entire front surface of a collector in the running direction, a non-coated section was provided by a known tape-peeling method so as to form a repetition with a coated section having a running direction length of 500 mm followed by the non-coated section having a running direction length of 50 mm (where the collector is exposed), and that the coated section and the non-coated section were provided also on the back surface of the web in the same manner.

(Evaluation of polarized electrode) Evaluation was made using the tab attachment property of the non-coated section, the homogeneity of the thickness of the coated section, and the state of wrinkle generation at the pressing time. The tab attachment property of the non-coated section was evaluated by the ink remaining and whether a tab could be attached or not. The ink remaining was visually observed. Those in which the electrode active material composition (ink) showed ink remaining on the non-coated section of the polarized electrodes of Examples and Comparative Examples were evaluated as not pass and denoted with x, whereas those which showed no ink remaining were evaluated as pass and denoted with ○. The tab attachment property was evaluated by attaching a tab on the non-coated section by a known method. Those in which the tab could be attached were evaluated as pass and denoted with ○, whereas those in which the tab could not be attached were evaluated as not pass and denoted with x.

The homogeneity of the thickness of the coated section was evaluated by measuring the thickness of the electrode active material layer while going at an interval of 1 mm from the application start position and going back at an interval of 1 mm from the application end position, and determining the distance by which the thickness before and after would be 10 μm or below. The wrinkles by pressing were visually observed.

As shown by the results described in Table 1, in Examples 1 to 4, there was no ink remaining, tabs could be attached without a problem, and the homogeneity of the application thickness was evaluated as pass. In Comparative Examples 1 to 2, little ink could be peeled off, and the ink remained to make the tab attachment impossible. The wrinkles at the pressing time were not generated in any of Examples 1 to 4 and Comparative Examples 1 to 2.

Example 8

Capacitor Using the Polarized Electrode of Example 4

An electric double layer capacitor was obtained in the same manner as in Example 5 except that the polarized electrode of Example 4 was used.

Here, the polarized electrodes of Comparative Examples 1 to 2 could not be made into an electric double layer capacitor, because tabs could not be attached to the polarized electrodes.

(Evaluation of Electric Double Layer Capacitor)

The electric double layer capacitors of Examples 5 to 8 were charged with electricity at an electric current of 2.5 V for 30 minutes, and discharging was carried out till 0 V for five cycles with 7 mA/cm$^2$ fixed, with the result that all of them functioned normally. Also, the capacitance of the electric double layer capacitors of Examples 5 to 8 increased to 140 F as compared with the conventional capacitance of 130 F.

INDUSTRIAL APPLICABILITY

As described above, a polarized electrode for an electric double layer capacitor according to the present invention is

TABLE 1

| Evaluation items | | Example 1 | Example 2 | Comparative Example 1 | Example 3 | Example 4 | Comparative Example 2 |
|---|---|---|---|---|---|---|---|
| Non-coated section | Ink remaining | ○ | ○ | X | ○ | ○ | X |
| | Tab attachment | ○ | ○ | X | ○ | ○ | X |
| Homogeneity of coated section thickness | Start of application | 2 mm | 2 mm | — | 2 mm | 2 mm | — |
| | End of application | 3 mm | 3 mm | — | 3 mm | 3 mm | — |

Example 5

Capacitor Using the Polarized Electrode of Example 1

Two sheets of the polarized electrodes of Example 1 were used and, after a tab was attached to the non-coated section of each, wound around disposing two sheets of separators therebetween and inserted into a container together with tetraethylammonium tetrafluoroborate 1 mol/l propylene carbonate solution. Each of the tabs was connected to the terminal section of the container and sealed to form an electric double layer capacitor.

Example 6

Capacitor Using the Polarized Electrode of Example 2

An electric double layer capacitor was obtained in the same manner as in Example 5 except that the polarized electrode of Example 2 was used.

Example 7

Capacitor Using the Polarized Electrode of Example 3

An electric double layer capacitor was obtained in the same manner as in Example 5 except that the polarized electrode of Example 3 was used.

such that an electrode active material layer having a pattern form is provided on one surface or on both surfaces of a collector, and the pattern form is composed of the electrode active material layer arranged intermittently at least in the longitudinal direction of the collector. The form of the pattern and/or the interval of the pattern and/or the positional relationship may be the same or different on the front surface and on the back surface. As a result of this, the amount of electrode active material per unit area can be increased, and further, the electric conduction path can be ensured with no increase in resistance because wrinkles are not generated even under high pressure at the time of pressing for making it have a higher density, and tabs can be welded to the periodic non-coated section.

With the electric double layer capacitor according to the present invention, more activated carbon can be put into a cell container having a predetermined volume, and the electric double layer capacitor has a high capacitance because of having less electric collection resistance with the tab terminals.

According to the method for producing a polarized electrode for an electric double layer capacitor of the present invention, a brittle composition having a high viscosity can be applied in a large application amount and also in a pattern form, and can be made to have a higher density through pressing by applying an existing die-coating method or comma reverse method.

The invention claimed is:

1. A method for producing a polarized electrode for an electric double layer capacitor having at least a pair of polarized electrodes, a separator and an electrolytic solution sealed in a container, the polarized electrode being formed with an electrode active material layer provided at least on one surface of a collector in a pattern form, wherein the pattern form is at least formed intermittently in a longitudinal direction of the collector, comprising at least steps of:

a) providing the collector;
b) providing an electrode active material composition;
c) forming the electrode active material layer in a predetermined form by applying the electrode active material composition on the collector so that a coated section having the electrode active material composition coated on the collector and a non-coated section not having the electrode active material composition coated on the collector are provided in a predetermined period in a running direction of the collector by a die-coating method in which a die head supplies the electrode active material composition intermittently, and drying the electrode active material layer;
d) pressing the collector on which the electrode active material layer is formed in the pattern form; and
e) slitting the collector after pressing in a predetermined size;

wherein the die-coating method according to the step of c') is a method such that the electrode active material composition is supplied from an ink pan filled with the electrode active material composition to the die head via a switching valve by an ink supplying pump and at the time of non-application the switching valve is switched to return the electrode active material composition to the ink pan.

2. An electric double layer capacitor having at least a pair of polarized electrodes produced by the method for producing a polarized electrode for an electric double layer capacitor according to claim 1, and a separator and electrolytic solution sealed in a container.

3. A method for producing a polarized electrode for an electric double layer capacitor according to claim 1, wherein a clearance of a lip land to a die lip of the die head is 100 to 1,000 μm.

* * * * *